United States Patent Office 2,970,977
Patented Feb. 7, 1961

2,970,977
METHOD OF PREPARING AN ACRYLONITRILE POLYMER INTER-LINKED BY A METAL ALCOHOLATE, COMPOSITION THEREOF, AND FILAMENT THEREFROM

Olof Sundén and Erling Mathias Sorvik, Ljungaverk, Sweden, assignors to Stockholms Superfosfat Fabriks Aktiebolag, Stockholm, Sweden, a corporation of Sweden No Drawing. Filed May 14, 1958, Ser. No. 735,125
Claims priority, application Sweden May 17, 1957
4 Claims. (Cl. 260—30.8)

Interlinking process and product

This invention generally relates to novel resinous polymers and copolymers of acrylonitrile having unusual utility in the preparation of synthetic fibers. More specifically, this invention relates to a method of preparing inter-linked acrylonitrile polymers and copolymers as well as a method for preparing filaments and fibers therefrom.

Background

It is well known that polyacrylonitrile and copolymers of high proportions of acrylonitrile and minor proportions of other polymerizable monomers are valuable fiber-forming compositions. Since these compositions have achieved so much commercial importance a great deal of research has been devoted to ways and means for improving their spinning properties. This invention is the result of research in this field.

Copending application

In copending application, Ser. No. 539,558, filed October 10, 1955 by Olof Sunden and Sven H. Sonnerskog, there is described and claimed a novel composition of matter which is soluble in common polymer solvents, such as dimethyl formamide, dimethyl acetamide and dimethyl sulfoxide. This novel composition comprises an acrylonitrile copoylmer containing at least 85 molar percent of acrylonitrile units and from 0 to about 15 molar percent of monoethylenically unsaturated monomer units copolymerizable with acrylonitrile, interlinked to a degree of one inter-link per from 2 to 12 polymeric molecules by means of an inter-linking polyfunctional monomer. This copending application also discloses a process for preparing said soluble acrylonitrile copolymers and methods for making synthetic fibers therefrom. Said degree of inter-linking or cross-linking may also be defined as 1 inter-link per 1000 to 20,000 monomer units in the polymer, which corresponds with the formation of centrally branched polymer molecules. When these inter-linked acrylonitrile copolymers are used for wet-spinning fibers into slow coagulating baths they enable one to attain a spinning rate of 10 to 17 m./minute and even higher, which one cannot attain with ordinary non-inter-linked acrylonitrile polymers and copolymers. The use of these inter-linked copolymers also results in fibers having better physical properties and an improved thermostability at elevated temperatures and therefore the range of uses of the fibers of this kind may be considerably broader than fibers made from non-interlinked copolymers.

This copending application particularly refers to a method for inter-linking an acrylonitrile copolymer during the polymerization step by carrying out the polymerization reaction in the presence of a slight amount of an inter-linking agent, the amount of the inter-linking agent being so low that an inter-linked polymer still soluble in common polymer solvents is obtained.

The invention broadly

In accordance with this invention we prepare a novel inter-linked acrylonitrile polymer or copolymer composition by treating an acrylonitrile polymer or copolymer with an inter-linking agent in a non-aqueous liquid system after the polymerization. As inter-linking agents we employ the alcoholates, or alkoxides, of polyvalent metals. These inter-linking agents react with the acrylonitrile polymer or copolymer in the non-aqueous medium.

The material to be interlinked

The present invention is useful for the preparation of fiber forming polyacrylonitrile resins and the copolymers of at least 80 percent acrylonitrile and up to 20 percent of another nonbasic polymerizable monomer. Suitable ethylenically unsaturated comonomers for the practice of this invention are vinyl chloride, vinyl acetate and other vinyl esters of aliphatic monocarboxylic acids having up to five carbon atoms, methyl methacrylate and other alkyl esters of methacrylic acid wherein the alkyl radical has up to five carbon atoms, acrylic acid, methyl acrylate and other alkyl esters of acrylic acid wherein the alkyl group has up to five carbon atoms, styrene and other vinyl substituted aromatic hydrocarbons, $\alpha$-methyl styrene and other isopropenyl substituted aromatic hydrocarbons, methacrylonitrile and vinylidene chloride.

The polyacrylonitrile and copolymers of acrylonitrile are prepared by emulsion polymerization in water or a modified solution polymerization method in which the monomer is dissolved in water with a suitable catalyst and the polymer product is a water slurry. Although any batch or continuous polymerization method is useful in the practice of this invention, preferred methods utilize the semibatch method, wherein a suitable reactor is charged with a fixed quantity of water, and acrylonitrile, or mixture of acrylonitrile and other monomer, possibly together with more water, is continuously added throughout the course of the polymerization.

The molecular weight range for fiber forming purposes is from about 30,000 to 100,000 preferably between 40,000 and 90,000, the latter figures corresponding to an intrinsic viscosity of 140 respectively 300 ml./g. measured in dimethyl formamide solution.

The copolymers to be treated in accordance with this invention may contain acid or hydrolyzable groups, such as an acrylic acid group, a methacrylic acid group or an acrylic acid ester group. Polymers consisting of 100% acrylonitrile without any sulfonic end groups can be inter-linked with the inter-linking agents of this invention, but more slowly than the aforementioned copolymers and to a more limited and reversible degree. The faster and more irreversible inter-linking of the copolymers is apparently due to the acidic or hydrolyzable groups or sulfate groups emanating from the polymerization system.

It has been noted that the inter-linking of 100% acrylonitrile does not seem to be stable at temperatures above 140° C., in contrast with the inter-linking of copolymers containing acidic groups. The inter-linking of 100% acrylonitrile polymers therefore appears to be reversible with temperature, but notwithstanding of interest for spinning such polymers.

The alcoholates of polyvalent metals

Aluminum isopropylate and titanium isopropylate are the preferred inter-linking agents for this invention. The aluminum isopropylate should be used freshly distilled. The titanium isopropylate is more water sensitive but has the advantage of being liquid at room temperature and it also does not form a precipitate with the moisture in the polymer solvent.

Although aluminum isopropylate and titanium isopropylate are the preferred inter-linking agents in accordance with this invention, a number of other polyvalent metal alcoholates are also quite suitable. For example, the polyvalent metal may be aluminum, titanium, calcium, magnesium or chromium and the alcoholate group may be a methylate, ethylate, propylate or butylate.

The amount of the polyvalent metal alcoholate used may vary between about 0.2 and 3.0 percent calculated on the weight of the aforementioned acrylonitrile polymer or copolymer, and is preferably between about 0.3 and 1.0 percent. The amount of inter-linking is substantially determined by the amount of alcoholate used. In case a slight amount of water is present, the amount of inter-linking is accordingly reduced.

*Reaction conditions*

It is important to maintain a non-aqueous reaction environment since the presence of water will decompose the polyvalent metal alcoholates and accordingly reduce or eliminate their inter-linking action. The inter-linking reaction may be carried out even when the aforesaid polymer or copolymers are dissolved in known solvents such as dimethyl formamide, dimethyl acetamide and dimethyl sulfoxide. In the event that a slight amount of water cannot be avoided, the desired degree of inter-linking may still be obtained by increasing the amount of the alcoholate so as to compensate for the amount of alcoholate which reacts with the water. When the copolymer and the solvent contain the usual low content of water (the polymer about 0.4% of water and the solvent, dimethyl formamide, 0.05-0.5% of water), an alcoholate addition in the range of about 1%, calculated on the copolymer, is sufficient to obtain the desired low degree of inter-linking of below 0.1 mol-percent, calculated on the number of monomer units of acrylonitrile and other monomers present. The temperature range for the dissolution of the polymer or copolymer and for the inter-linking reaction is about 10 to 100° C.

*The spinning conditions*

The novel inter-linked copolymers produced in accordance with this invention may be spun into filaments by using essentially the same techniques that are employed to produce filaments from non-inter-linked polymers and copolymers of acrylonitrile. The spinning method generally involves extruding a solution of the said copolymers in an appropriate solvent into a bath that is miscible with the polymer solvent but precipitates the polymer in its filament form. The polymer solvents preferred are dimethyl formamide, dimethyl acetamide and dimethyl sulfoxide. As coagulants water, aqueous solutions, alcohols, such as glycerine, aromatic hydrocarbons, such as benzene and cymene, may be used. The solutions of the inter-linked polymers according to this invention may advantageously be extruded in very slow acting coagulating baths, such as hydrocarbons predominantly consisting of paraffinic hydrocarbons such as commercial paraffinic kerosenes. Solutions of the said inter-linked polymers or copolymers may also be extruded into a heated spinning cell in accordance with the common dry-spinning technique. Obviously, mixtures of the said inter-linked copolymers, and other polymers or copolymers may be used for forming filaments as stated. The various spinning techniques are more completely described in various U.S. Patents e.g. in Patents Nos. 2,404,714 and 2,404,715 and the spinning into liquid hydrocarbon mixtures in the copending patent applications Serial Number 327,429 filed Dec. 22, 1952 now abandoned, Serial Number 662,316 filed Aug. 29, 1957 and Serial Number 662,352 filed May 29, 1957.

*The inter-linked product*

The inter-linked products formed in accordance with the process of this invention have been found to have the properties illustrated by the examples.

EXAMPLES

The following examples are illustrative of preferred procedures for carrying out the present invention. It should be understood that these examples are not intended to limit the invention and that obvious changes may be made by those skilled in the art without changing the essential characteristics and the basic concept of the invention. The parts and percentages are by weight.

EXAMPLE I 250 g. of a non-inter-linked acrylonitrile copolymer containing about 5% of methylacrylate, 0.4% of moisture and having an average molecular weight of 40,000 corresponding to a viscosity of $n=140$ (1.4 dl./g.) were dissolved during stirring in 750 ml. of dimethyl formamide (containing about 0.03% of moisture) in which previously 1.25 g. of aluminum isopropylate was dissolved. The thus prepared 25% copolymer solution had a viscosity corresponding to a ball time of 380 sec./100 mm. at 25° C. using a 3.2 mm. bearing ball of 130 mg. weight and the measurement was performed in a glass tube of 200 mm. length and 22 mm. internal diameter. The corresponding ball time value for a solution of the same acrylonitrile copolymer prepared without aluminum isopropylate was 322 sec./100 mm.

After filtering and de-aeration the 25% spinning solution was extruded through a spinneret having 36 holes and 0.18 mm. hole diameter, provided in the bottom of a vertical spinning shaft of 1 m. height filled up with Nysolvin, from Nynäs Petroleum, Sweden, which is a practically aromatic free kerosene coagulant having a boiling range of about 160–250° C. The kerosene coagulant passed the spinning shaft in counter current relationship to the extruded fiber and was kept at about 130° C. by means of a heat jacket. The spinning temperature should be less than 140° C. in order to avoid rupture of the extruded fiber gel. The spinning solution was extruded with a speed of about 10 m./min. and the fibers formed were taken up from the upper end of the shaft with a speed of about 30 m./min., whereby the fiber was stretched three-fold during the coagulation. Thereafter the fiber was further stretched over a following roller seven-fold after leaving the Nysolvin coagulant bath, washed in boiling water and then dried to remove the coagulant and remaining solvent.

The strength value and the aluminum content of the thus prepared fibers are set forth in the following table. There is also set forth comparative data for a fiber prepared from the same acrylonitrile copolymer and in the same apparatus, but which was made without an alcoholate inter-linking agent. This noninter-linked copolymer was extruded into a cymene coagulating medium because it was found that non-inter-linked copolymers require a stronger coagulant during the prevailing spinning conditions.

TABLE

|  | Inter-Linked Copolymer | Non-Inter-Linked Copolymer |
|---|---|---|
| Fiber thickness, den | 5.5 | 5.5 |
| Rupture limit: | | |
| g./grex | 3.12 | 2.97 |
| Percent elongation | 42.1 | 25.8 |
| Work-to-break factor, rupture limit×elongation | 130 | 77 |
| Creep limit: | | |
| g./grex | 0.97 | 0.91 |
| Percent elongation | 1.69 | 1.53 |
| Modulus, g./grex | 0.51 | 0.58 |
| Al-content, percent | 0.06 | |

EXAMPLE II

Essentially the same operation as is set forth in Example I was repeated with an acrylonitrile polymer comprising 100% of acrylonitrile having a molecular weight corresponding to a viscosity of $n=240$ and treated with aluminum isopropylate. The minimum value of the aluminium isopropylate was found to be about 0.5% based on the weight of the polymer. After spinning as stated in Example 1 at 130° the fiber properties were found to be about the same as given in Example 1, viz.

Fiber thickness, den. _____ 5.5
Tensile strength, g./grex _____ 3.3
Elongation at break, percent _____ 33

A spinning temperature higher than 130° should be avoided.

EXAMPLE III

Essentially the same operation as is set forth in Example I was repeated with an acrylonitrile copolymer containing 97% of acrylonitrile and 3% of acrylic acid and having a molecular weight corresponding a viscosity of $n=240$, and which was treated with aluminum isopropylate. The minimum value of the aluminum isopropylate was found to be 0.3% based on the weight of the polymer. After spinning as stated in Example 1 the fiber properties were found to be substantially the same as in Example 1. The spinning temperature could be kept as high as 160° C.

As to the molecular orientation of the fibers, as measured by X-ray diffraction, it should be emphasized that the fiber of Example 2 comprising of inter-linked polymer of 100% of acrylonitrile shows a higher degree of orientation compared with the fiber of Example 3 comprising an inter-linked polymer consisting of 97% acrylonitrile and 3% acrylic acid. This result corresponds with the fact that permanently inter-linked polymers after a fixed stretch show less X-ray orientation than reversibly inter-linked polymers. As stated in Example 3 the spinning temperature could be kept as high as 160° C. while a spinning temperature of only 130° C. or lower must be used for alkoxide inter-linked polymers without acidic groups as stated in Example 2. Also the tensile strength at 150° C. shows differences between permanently inter-linked polymers and reversibly inter-linked polymers, the latter having only about 40% of the strength of the former.

EXAMPLE IV

Essentially the same operation as is set forth in Example 1 was repeated with a 24% polymer solution containing the same linear copolymer as stated in Example 1, but with the addition of 0.5% titanium isopropylate instead of aluminum isopropylate. Substantially the same results were obtained as were obtained in Example 1. The amount of titanium alcoholates in the spinning solution seems to be of about the same order as for aluminum alcoholates or between 0.2–1.0% of the polymer, depending mostly on the molecular weight of the polymer and the concentration of the spinning solution. Titanium alcoholates seem to give fibers of whiter appearance than aluminum alcoholates.

The fiber properties were:

Fiber thickness, den. _____ (=7.7 grex)__ 7
Tensile strength, g./grex _____ 3.5
Elongation at break, percent _____ 37.2
Modulus, g./den. _____ (=0.52 g./grex)__ 0.57

Advantages of invention

A solution of 18–25% of inter-linked acrylonitrile copolymer prepared in the manner described above shows an about 20–30% increased viscosity compared with a spinning solution of a linear non-inter-linked polyacrylonitrile of the same concentration. Moreover, it shows a greatly improved spinnability in slow acting coagulants such as liquid hydrocarbon mixtures containing predominantly paraffinic hydrocarbons, e.g. kerosene containing not more than about 35% of aromatic hydrocarbons, enabling a greater spinning rate and higher stretching during the coagulation, and considerably improved mechanical properties of the final product are obtained compared with non-inter-linked polyacrylonitrile in the final product, i.e. the fiber as illustrated in the table of Example 1.

Although the above description only mentions that the products of this invention are useful in the textile art, it should be understood that they are also applicable to the production of films, tubing shaped articles, etc.

We claim:
1. A novel composition of matter comprising a resinous material selected from the group consisting of the homopolymers of acrylonitrile and copolymers of acrylonitrile and copolymers of acrylonitrile and an ethylenically unsaturated monomer copolymerizable therewith inter-linked by between about 0.2% and 3% by weight of an alcoholate of a polyvalent metal selected from the group consisting of aluminum, titanium, calcium, magnesium and chromium, the alcoholate group of which is a radical selected from the group consisting of methylate, ethylate, propylate and butylate.

2. A novel composition comprising a non-aqueous solution of the composition set forth in claim 1.

3. A filament prepared from the composition set forth in claim 1.

4. A method for preparing a cross-linked resinous material which comprises bringing a resinous material selected from the group consisting of the homopolymers of acrylonitrile and copolymers of acrylonitrile and an ethylenically unsaturated monomer copolymerizable therewith into contact with between about 0.2 and 3.0% by weight of an alcoholate of a polyvalent metal selected from the group consisting of aluminum, titanium, calcium, magnesium and chromium, the alcoholate group being a radical selected from the group consisting of methylate, ethylate, propylate and butylate, said two materials being brought into contact in a non-aqueous medium at a temperature between about 10 and 100° C.

References Cited in the file of this patent

UNITED STATES PATENTS

| | | |
|---|---|---|
| 2,666,772 | Boyd | Jan. 19, 1954 |
| 2,744,074 | Theobald | May 1, 1956 |
| 2,775,507 | Downing et al. | Dec. 25, 1956 |